United States Patent [19]
Yaoi et al.

[11] Patent Number: 5,204,298
[45] Date of Patent: Apr. 20, 1993

[54] BASIC MONOLITHIC REFRACTORIES

[75] Inventors: Hideo Yaoi, Aichi; Toshihiro Isobe, Hyogo; Yukihiro Suekawa, Fukuoka, all of Japan

[73] Assignees: Harima Ceramic Co., Ltd., Hyogo; Krosaki Corporation, Fukuoka; Nippon Steel Corporation, Tokyo, all of Japan

[21] Appl. No.: 795,950

[22] Filed: Nov. 21, 1991

[30] Foreign Application Priority Data

Nov. 28, 1990 [JP] Japan ................... 20328435

[51] Int. Cl.$^5$ ................................. C04B 35/04
[52] U.S. Cl. ................. 501/108; 501/104; 501/121; 501/122
[58] Field of Search ............ 501/104, 108, 121, 122

[56] References Cited

U.S. PATENT DOCUMENTS

| | | | |
|---|---|---|---|
| 4,010,039 | 3/1977 | de Aza et al. | 501/104 |
| 4,126,478 | 11/1978 | Bowman | 501/122 |
| 4,696,455 | 9/1987 | Johnson | 501/121 X |
| 4,721,691 | 1/1988 | Kawano | 501/108 |

FOREIGN PATENT DOCUMENTS

| | | |
|---|---|---|
| 60-44262 | 10/1985 | Japan . |
| 62-275055 | 11/1987 | Japan . |
| 63136125 | 2/1990 | Japan . |
| 63136126 | 2/1990 | Japan . |

*Primary Examiner*—Karl Group
*Attorney, Agent, or Firm*—Wenderoth, Lind & Ponack

[57] ABSTRACT

Basic monolithic refractories of which the chemical composition consists essentially of, in oxide equivalence, 65%–96% by weight of MgO, 2.6%–20% by weight of $ZrO_2$, 1.3–10% by weight of $SiO_2$, 2% or less by weight of CaO, 0.5% or less by weight of $Fe_2O_3$ and 1% or less by weight of $Al_2O_3$, and with a mineral composition containing periclase as the main component and cubic zirconia and forsterite as sub-components, and with apparent porosity of 7% or less and bulk density of 3.2 g/cm$^3$ or more.

Basic monolithic refractories under this invention possess excellent slaking resistance, slag erosion resistance, slag penetration resistance and spalling resistance. They exhibit an excellent service life, especially as lining material for steel-making furnaces.

2 Claims, 2 Drawing Sheets

BASIC MONOLITHIC REFRACTORIES

BACKGROUND OF THE INVENTION

This invention relates to basic monolithic refractories featuring superb slaking resistance. erosion resistance and spalling resistance.

Concerning linings of steel-making furnaces there has been a tendency to shift from piled to monolithic refractories for labor saving purposes during construction. Especially, linings made of monolithic refractories are being increasingly adopted for ladles and tundishes used in the continuous casting method Examining the material qualities of monolithic refractories used on ladles, there is an increasing trend towards the use of erosion resistant neutral refractories such as alumina-spinel in lieu of conventional acid refractories such as agalmatolite and zircon. However, due to the recent trend toward harsher furnace operations and the need to reduce the amount of refractories used, the service life of monolithic refractories is still insufficient. Acid and neutral monolithic refractories, on the other hand, are not desirable either, from the viewpoint of recent requirements for the production of clean steel. Monolithic refractories are categorized by application methods into casting application type, spray application type and press-in application type. However, the problems stated above are common to all types of monolithic refractories.

Accordingly, basic monolithic refractories consisting mainly of magnesia clinker have been suggested, as seen in the Japanese provisional Patent Publication No.54-70312 or No.1-111779. Basic monolithic refractories excel in resistance to basic slag and are more desirable from the viewpoint of clean steel production.

However, basic monolithic refractories have less spalling resistance due to the fact that they have higher degrees of thermal expansion and slag penetration. Also, since the use of a large amount of water is required when applying monolithic refractories, basicity causes slaking problems due to reaction with the water.

Slaking is a phenomenon wherein, for example, MgO in magnesia clinker reacts with water to become magnesium hydroxide. Cubical expansion resulting from this reaction causes cracking or collapse. Also, magnesium hydroxide generated by this slaking suffers thermal decomposition due to the rise in temperature during use, thus raising the internal pressure of the refractory-applied object, resulting in blasting and collapse.

Accordingly, it has been suggested that to improve slaking resistance. $SiO_2$ and $Fe_2O_3$, for example, should be added to magnesia clinker, the main component However, this does not prevent slag penetration and, furthermore, these additives cause deterioration of erosion resistance. A magnesia clinker exhibiting a lower thermal expansion coefficient due to the inclusion of zirconia has been suggested. For example, the invention as stated in the Japanese Patent Publication No.60-44262 is of a magnesium clinker consisting of 95% or more of MgO, 0.05%-2.0% of $ZrO_2$ and 0.2%-1.0% of $SiO_2$, with a structure wherein the magnesia crystal is encased in a mineral matrix containing zirconia. Also, in the Japanese Provisional Patent Publication No.62-275055, a magnesia clinker with 98% or more of $MgO + ZrO_2$, 68%-93% or more of MgO, 5%-30% of $ZrO_2$ and 0.5% or less of $SiO_2$ was disclosed.

However, monolithic refractories using these types of magnesia clinker have inadequate slaking resistance and less structural spalling resistance due to slag penetration.

SUMMARY OF THE INVENTION

The inventors have conducted repeated studies to obtain basic monolithic refractories that exhibit slaking resistance, slag penetration resistance and spalling resistance. As a result, by developing a refractory material partially or totally of magnesia clinker having a chemical composition of MgO, $ZrO_2$ and $SiO_2$, and containing periclase as the main component, and having a mineral composition whose sub-components are cubic zirconia and forsterite, satisfactory results were obtained, leading to completion of this invention.

This invention covers basic monolithic refractories composed of magnesia clinker with a chemical composition, in oxide equivalence, consisting essentially of 65%-96% by weight of MgO, 2.6%-20% by weight of $ZrO_2$, 1.3%-10% by weight of $SiO_2$, 2% or less by weight of CaO, 0.5% or less by weight of $Fe_2O_3$, and 1% or less by weight of $Al_2O_3$. The mineral composition contains periclase as the main component, and cubic zirconia and forsterite as the sub-components, and features an apparent porosity of 7% or less and a bulk density of 3; 2 $g/cm^3$ or more.

BRIEF DESCRIPTION OF THE DRAWINGS

All the drawings are test result graphs of monolithic refractories.

DESCRIPTION OF THE PREFERRED EMBODIMENTS

As mentioned above, the chemical composition of the magnesia clinker used as the main ingredient in this invention consists essentially of, in oxide equivalence, 65%-96% by weight of MgO, 2.6%-20% by weight of $ZrO_2$, 1.3%-10% by weight of $SiO_2$, 2% or less by weight of CaO, 0.5% or less by weight of $Fe_2O_3$ and 1% or less by weight of $Al_2O_3$.

If the MgO content exceeds the above range. deterioration occurs in the slag penetration resistance, spalling resistance and slaking resistance, while if it decreases, slag penetration resistance deteriorates due to an increase in the apparent porosity of the magnesia clinker. If the $ZrO_2$ or $SiO_2$ content exceeds the above ranges, the grain boundary matrix of the periclase crystals in the clinker increases, suppressing crystal growth during production of the clinker and resulting in a smaller average grain size. When the grain size of the periclase crystals is small, the apparent porosity of the magnesia clinker increases, resulting in deterioration of slag penetration resistance. Conversely, if the $ZrO_2$ or $SiO_2$ content goes below the above ranges, deterioration occurs in slaking resistance, slag penetration resistance and spalling resistance. It is more desirable for the contents of components other than MgO. $ZrO_2$ and $SiO_2$ to be as small as possible. If the contents of CaO, $Al_2O_3$ and $Fe_2O_3$ exceed the above ranges, the deterioration in erosion resistance occurs.

The mineral composition of magnesia clinker consists of periclase as the main component and cubic zirconia and forsterite as sub-components. The desirable ratios of each of these minerals are, 63%-84% by weight of periclase, 2.6%-20% by weight of cubic zirconia and 3%-23% by weight of forsterite Furthermore, by limiting the apparent porosity of magnesia clinker to 7% or less and the bulk density of the magnesia clinker to 3.2 g/cm$^3$ or more, excellent stability in volume is obtained. For example, the refractory structure proves to be resistant to thermal shock occurring when molten steel is poured into a ladle, without exhibiting any deterioration in strength. This effect becomes even more prominent when the bulk porosity is limited to 2% or less and the apparent density is 3.35g/cm$^3$ or more.

With the aforementioned magnesia clinker used in this invention, the MgO sources including magnesite, brucite, synthetic magnesium hydroxide and magnesium oxide, and the $ZrO_2$ and $SiO_2$ sources such as zircon ($ZrSiO_4$), are mixed before pressurized molding and are then sintered at a temperature of 1,500° C.-1,850° C. in a rotary kiln for completion.

Figure 1:
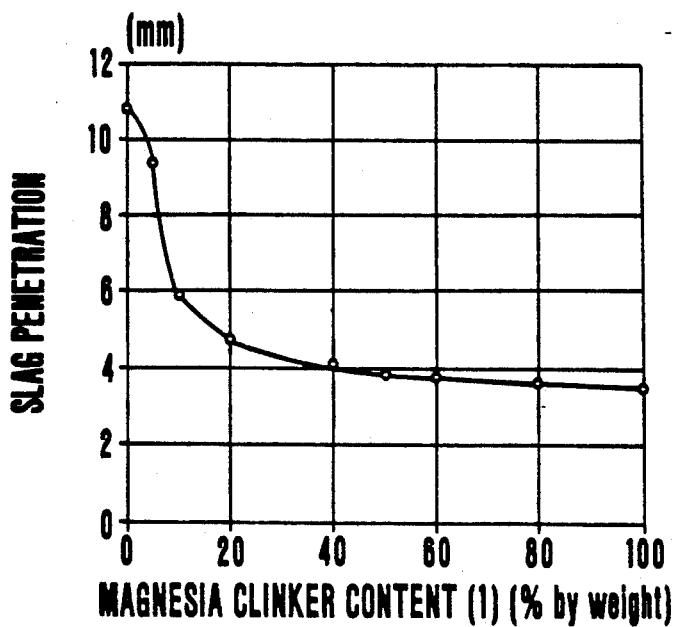
FIG. 1 graphically shows the relationship between the mixing ratio of magnesia clinker <1> and the resistance to slag penetration.
Figure 2:
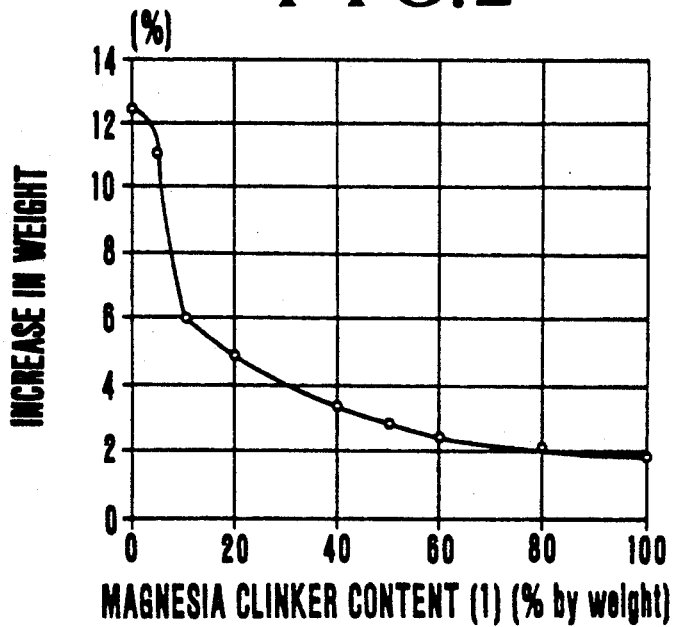
FIG. 2 graphically shows the relationship between the mixing ratio of magnesia clinker <1> and the slaking resistance.
Figure 3:
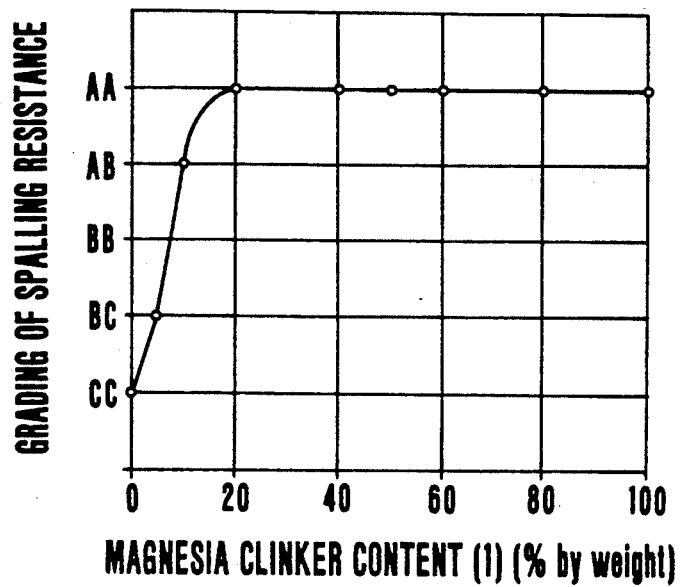
FIG. 3 graphically shows the relationship between the mixing ratio of magnesia clinker <1> and the spalling resistance.

FIGS. 1-3 graphically show the test results of slag penetration resistance, slaking resistance and spalling resistance. Based on the undermentioned proportioning composition using magnesia clinker <3> as the main material (Table 1), testing was carried out by replacing it with magnesia clinker <1> (Table 1). The fine, medium, and coarse grain portions were successively replaced with those of magnesia clinker <1> (Table 1) in order to determine the relationship between the replacement quantity and physical properties of the monolithic refractories.

Meanwhile, tests to determine the physical properties were carried out using the same method. The examples appear later.

| | |
|---|---|
| Magnesia clinker <3> Coarse grain (10-1 mm) | 50% by weight |
| Magnesia clinker <3> Medium grain (1 mm or less) | 20% by weight |
| Magnesia clinker <3> Fine grain (0.074 mm or less) | 30% by weight |
| Alumina cement | 5% (by weight of refractories) |
| Tripolysodiumphosphate | 0.1% (by weight of refractories) |

Magnesia clinker <1> possesses the composition and physical properties prescribed in this invention and the improvement was found in each of the physical properties in proportion to the replacement quantity used. As the graphs show, the replacement quantity needed to improve the physical properties is 10% or more by weight.

When mixing other refractory materials, one, two or more types may be selected. For example, calcined alumina shale, calcined or sintered bauxite, sillimanite, synthetic mullite, fused or sintered alumina, activated alumina, diaspore. Bayer-processed aluminum oxide, sea water magnesia clinker, magnesia materials such as magnesite ores and sintered or electromolten magnesite ores, electromolten or sintered spinel clinker, zircon, zirconia, dolomite clinker, etc.

Similarly to existing monolithic refractories, binding and dispersing agents may be added, or, when necessary, silica flour, clay, silicon carbide, carbon powder, graphite, metal powder, metal fibers, organic fibers, inorganic fibers, etc. may also be added.

Usable binding agents include amorphous silicas such as colloidal silica, volatile silica and silica gel, hydraulic cements such as alumina cement and Portland cement, alkaline metallic salts such as sodium phosphate, phosphate glass, sodium silicate and potassium nitrate, alkaline earth metallic salts such as aluminum phosphate, aluminum sulfate and potassium phosphate, inorganic binders such as orthophosphoric acid, carbonaceous binders such as pitches, organic binders such as phenol resins and furan resins, pulp mill waste liquor, and bittern.

A number of examples of this invention are given in Tables 2-4. The test results are also indicated.

Table 1 shows the properties of the refractory materials used in the examples. In this table, the magnesia clinkers <1> and <2> possess properties within the range of this invention, and magnesia clinker <4> has properties that exceed the range. Magnesia clinker <3> is one of the commonly-used monolithic refractories.

Table 2 shows the examples for casting applications. Table 3, those for spray applications, and Table 4, those for pressurized applications.

The tests shown in these tables were carried out and measured under the following conditions. Except for the tests using actual machines, cast specimens were used in all tests.

Slag erosion resistance

Using a high frequency induction furnace manufactured by Fuji Dempa Kogyo, Co. Ltd., featuring slag with a $CaO/SiO_2$ mole ratio of 3 and containing 10% by weight of $Al_2O_3$ as the erosive, the specimens were soaked in a erosive melt at 1,600 % for half an hour, the cycle repeated ten times, and the depth of erosion was measured.

Slag penetration resistance

The depth of the slag penetrated layer was measured on the cut plane of the specimens used in the above slag erosion resistance test.

Spalling resistance

The specimens were placed in a rotary slag erosion tester manufactured by Toda Cho-Taikabutsu, Co., Ltd., using converter slag (with a $CaO/SiO_2$ mole ratio of 3) as the erosive, then tested at 1,600° C. for one hour, with the cycle repeated five times. Furthermore, the specimens subjected to this erosion test were quick-heated to 1,600° C., maintained at this temperature for half an hour and then quick-cooled to 500° C., and the cycle repeated five times.

By observing the cut plane of the specimens, the existence of cracks between the slag penetrated and unpenetrated layers was determined and their extent was evaluated according to the following standards:
AA: No cracks
AB: Slight existence of fine cracks
BB: Fine cracks exist
BC: Small cracks exist
CC: Large cracks exist

Slaking resistance

Placing the specimens in an autoclave at 152° C.×5 atmospheric pressure for three hours, the weight increase ratio was checked.

Actual machinery tests

Using monolithic refractories for casting as shown in Table 2, a lining was formed on the slag line section of a 250-ton ladle and the speed of erosion was checked.

Using the examples for spraying applications as shown in Table 3, the sample was used to repair a 250-ton converter lined by MgO-C bricks and the number of endurance cycles checked. A wet-type spray gun was used for spraying.

For pressurizing applications as shown in Table 4, a squeeze type pressurizing pump was used, the bore of the reflux pipe of an RH-type vacuum deaerating furnace repaired and the number of endurance cycles checked.

As the test results show for each of the above cases, the examples of this invention exhibited satisfactory results in terms of slag erosion resistance, slag penetration resistance, spalling resistance, slaking resistance and actual machine tests.

On the contrary, conventional magnesia clinkers were used in Comparisons 1, 6 and 10 and were found to be inferior in terms of slag penetration resistance, slaking resistance and spalling resistance. In the case of Comparisons 2, 7 and 13, in which zircon was combined with conventional magnesia clinker, although improvement was noted in slag penetration resistance to some extent, slaking resistance and spalling resistance were still unsatisfactory. Since alumina-spinel refractories were used in Comparisons 3 and 12 due to the fact that no magnesia effect was expected, slag erosion resistance was found to be very inferior.

As for Comparison 4, although slaking resistance was comparatively good since spinel was used for the fine grain portion, slag erosion resistance, slag penetration resistance and spalling resistance were inferior.

Magnesia clinkers with less MgO and more $SiO_2$ and $ZrO_2$ than the amount prescribed by this invention were used in Comparisons 5 and 9 but were still found to be inferior in slag erosion resistance.

Comparison 8 was found to exhibit inferior slaking and spalling resistance, while slag erosion and slag penetration resistance were still unsatisfactory.

Comparison 11 for alumina types was found to exhibit inferior slag erosion and spalling resistance.

Comparison 14 for alumina-magnesia types proved to be as inferior in terms of slag erosion resistance as when conventional magnesia clinkers were used.

TABLE 1

Properties of material used in present tests

| | Chemcial composition (% by weight) | | | | | | Mineral composition | | |
|---|---|---|---|---|---|---|---|---|---|
| | MgO | CaO | $SiO_2$ | $Fe_2O_3$ | $Al_2O_3$ | $ZrO_2$ | Periclase | Cubic zirconia | Forsterite |
| Magnesia clinker <1> | 89.03 | 0.80 | 3.34 | 0.09 | 0.13 | 6.46 | ++++ | +− | + |
| Magnesia clinker <2> | 79.34 | 0.68 | 6.56 | 0.09 | 0.13 | 13.00 | ++++ | ++ | +− |
| Magnesia clinker <3> | 99.09 | 0.50 | 0.25 | 0.08 | 0.08 | — | ++++ | not found | not found |
| Magnesia clinker <4> | 59.17 | 0.45 | 13.24 | 0.12 | 0.14 | 26.58 | +++ | +++ | ++ |
| Sintered spinel | 28.41 | 0.40 | 0.32 | 0.04 | 70.39 | — | + | not found | not found |
| Sintered alumina | — | 0.05 | 0.10 | 0.03 | 99.47 | — | not found | not found | not found |
| Zircon flour | 0.12 | 0.06 | 32.46 | 0.18 | 0.62 | 66.24 | not found | not found | not found |
| Dolomite clinker | 74.47 | 22.68 | 1.03 | 1.06 | 0.19 | — | +++ | not found | not found |

| | Mineral composition | | | | Apparent Prosity (%) | Bulk density (g/cm³) |
|---|---|---|---|---|---|---|
| | Monticellite | Spinel | Corundum | Zircon | CaO | | |
| Magnesia clinker <1> | not found | not found | not found | not found | not found | 1.3 | 3.44 |
| Magnesia clinker <2> | not found | not found | not found | not found | not found | 1.9 | 3.49 |
| Magnesia clinker <3> | + | not found | not found | not found | not found | 2.1 | 3.40 |
| Magnesia clinker <4> | not found | not found | not found | not found | not found | 8.4 | 3.55 |
| Sintered spinel | not found | ++++ | not found | not found | not found | 1.9 | 3.17 |
| Sintered alumina | not found | not found | ++++ | not found | not found | 1.7 | 3.46 |
| Zircon flour | not found | not found | not found | ++++ | not found | — | — |
| Dolomite clinker | not found | not found | not found | not found | ++ | 3.6 | 3.23 |

Mineral composition; Substantial quantity ++++ > +++ > ++− > ++ > + > − Minimal quantity

TABLE 2

Examples of monolithic refractories for casting applications

| | Present Invention | | | | | | | |
|---|---|---|---|---|---|---|---|---|
| | 1 | 2 | 3 | 4 | 5 | 6 | 7 | 8 |

Compositions (% by weight)

TABLE 2-continued

Examples of monolithic refractories for casting applications

| | | | | | | | | |
|---|---|---|---|---|---|---|---|---|
| Magnesia clinker<1> 10-1 mm | 50 | | 50 | 10 | | | | |
| Magnesia clinker<1> 1 mm or less | 20 | | | | 20 | | | |
| Magnesia clinker<1> 0.07 mm or less | 30 | | | | 30 | 10 | 5 | |
| Magnesia clinker<2> 10-1 mm | | 50 | | | | | | |
| Magnesia clinker<2> 1 mm or less | | 20 | | | | | | |
| Magnesia clinker<2> 0.07 mm or less | | 30 | | | | | | 10 |
| Magnesia clinker<3> 10-1 mm | | | | 40 | 50 | 50 | 50 | 50 |
| Magnesia clinker<3> 1 mm or less | | | 20 | 20 | | 20 | 20 | 20 |
| Magnesia clinker<3> 0.07 mm or less | | | 30 | 30 | | 20 | 25 | 20 |
| Magnesia clinker<4> 10-1 mm | | | | | | | | |
| Magnesia clinker<4> 1 mm or less | | | | | | | | |
| Magnesia clinker<4> 0.07 mm or less | | | | | | | | |
| Sintered spinel 10-1 mm | | | | | | | | |
| Sintered spinel 1 mm or less | | | | | | | | |
| Sintered spinel 0.07 mm or less | | | | | | | | |
| Sintered alumina 10-1 mm | | | | | | | | |
| Sintered alumina 1 mm or less | | | | | | | | |
| Sintered alumina 0.07 mm or less | | | | | | | | |
| Zircon flour | | | | | | | | |
| Alumina cement | (5) | (5) | (5) | (5) | (5) | (5) | (5) | (5) |
| (% by weight of refractoties) | | | | | | | | |
| Tripolysodiumphosphate | (0.1) | (0.1) | (0.1) | (0.1) | (0.1) | (0.1) | (0.1) | (0.1) |
| (% by weight of refractoties) | | | | | | | | |
| Tests | | | | | | | | |
| Slag erosion resistance (mm) | 4.5 | 4.8 | 4.4 | 4.6 | 4.3 | 4.5 | 4.7 | 4.7 |
| Slag penetration resistance (mm) | 3.6 | 3.2 | 7.9 | 9.9 | 4.0 | 5.9 | 8.8 | 5.8 |
| Spalling resistance | AA | AA | AB | BB | AA | AB | BC | AB |
| Slaking resistance | 1.6 | 1.2 | 8.8 | 11.8 | 2.9 | 7.2 | 11.1 | 7.1 |
| Increase in weight (% by weight) | | | | | | | | |
| Actual machine test | 1.8 | 1.7 | 2.5 | 3.9 | 2.2 | 2.9 | 4.7 | 2.8 |
| (Depth of erosion/Number of cycles undergone) | | | | | | | | |

| | Present Invention | | | Comparisons | | | | |
|---|---|---|---|---|---|---|---|---|
| | 9 | 10 | 11 | 1 | 2 | 3 | 4 | 5 |
| Compositions (% by weight) | | | | | | | | |
| Magnesia clinker<1> 10-1 mm | | | 50 | | | | | |
| Magnesia clinker<1> 1 mm or less | | | 20 | | | | | |
| Magnesia clinker<1> 0.07 mm or less | | | 25 | | | | | |
| Magnesia clinker<2> 10-1 mm | | | | | | | | |
| Magnesia clinker<2> 1 mm or less | 20 | 20 | | | | | | |
| Magnesia clinker<2> 0.07 mm or less | 30 | 30 | | | | | | |
| Magnesia clinker<3> 10-1 mm | | | | 50 | 50 | | 50 | |
| Magnesia clinker<3> 1 mm or less | | | | 20 | 20 | | 20 | |
| Magnesia clinker<3> 0.07 mm or less | | | | 30 | 20 | | | |
| Magnesia clinker<4> 10-1 mm | | | | | | | | 50 |
| Magnesia clinker<4> 1 mm or less | | | | | | | | 20 |
| Magnesia clinker<4> 0.07 mm or less | | | | | | | | 30 |
| Sintered spinel 10-1 mm | 50 | | | | | | | |
| Sintered spinel 1 mm or less | | | | | | | | |
| Sintered spinel 0.07 mm or less | | | | | | 30 | 30 | |
| Sintered alumina 10-1 mm | | 50 | | | | 50 | | |
| Sintered alumina 1 mm or less | | | | | | 20 | | |
| Sintered alumina 0.07 mm or less | | | | | | | | |
| Zircon flour | | | 5 | | 10 | | | |
| Alumina cement | (5) | (5) | (5) | (5) | (5) | (5) | (5) | (5) |
| (% by weight of refractoties) | | | | | | | | |
| Tripolysodiumphosphate | (0.1) | (0.1) | (0.1) | (0.1) | (0.1) | (0.1) | (0.1) | (0.1) |
| (% by weight of refractoties) | | | | | | | | |
| Tests | | | | | | | | |
| Slag erosion resistance (mm) | 5.9 | 6.2 | 5.0 | 4.6 | 5.1 | 15.3 | 7.4 | 10.5 |
| Slag penetration resistance (mm) | 4.1 | 4.2 | 3.0 | 10.5 | 7.8 | 3.8 | 8.4 | 3.3 |
| Spalling resistance | AA | AA | AA | CC | BB | AA | BB | AA |
| Slaking resistance | 1.1 | 1.0 | 1.5 | 12.5 | 7.3 | 0.7 | 3.0 | 1.4 |
| Increase in weight (% by weight) | | | | | | | | |
| Actual machine test | 2.5 | 3.3 | 1.7 | 5.6 | 3.2 | 6.1 | 4.9 | 5.3 |
| (Depth of erosion/Number of cycles undergone) | | | | | | | | |

TABLE 3

Examples of monolithic refractories for spray applications

| | Present Invention | | | | | | Comparisons | | | |
|---|---|---|---|---|---|---|---|---|---|---|
| | 12 | 13 | 14 | 15 | 16 | 17 | 6 | 7 | 8 | 9 |
| Compositions (% by weight) | | | | | | | | | | |
| Magnesia clinker<1> 5-1 mm | 40 | 40 | | | 40 | | | | | |
| Magnesia clinker<1> 1 mm or less | 35 | | | | 35 | 35 | | | | |
| Magnesia clinker<1> 0.074 mm or less | 25 | | 10 | 5 | 20 | 25 | | | | |
| Magnesia clinker<3> 5-1 mm | | | 40 | 40 | | | 40 | 40 | 20 | |

TABLE 3-continued

Examples of monolithic refractories for spray applications

|  | Present Invention | | | | | | Comparisons | | | |
|---|---|---|---|---|---|---|---|---|---|---|
|  | 12 | 13 | 14 | 15 | 16 | 17 | 6 | 7 | 8 | 9 |
| Magnesia clinker<3> 1 mm or less | 35 | 35 | 35 |  |  |  | 35 | 35 | 25 |  |
| Magnesia clinker<3> 0.074 mm or less | 25 | 15 | 20 |  |  |  | 25 | 15 | 25 |  |
| Magnesia clinker<4> 5-1 mm |  |  |  |  |  |  |  |  |  | 40 |
| Magnesia clinker<4> 1 mm or less |  |  |  |  |  |  |  |  |  | 35 |
| Magnesia clinker<4> 0.074 mm or less |  |  |  |  |  |  |  |  |  | 25 |
| Sintered spinel 5-1 mm |  |  |  |  | 40 |  |  |  |  |  |
| Zircon flour |  |  |  | 5 |  |  |  | 10 |  |  |
| Dolomite clinker 5-1 mm |  |  |  |  |  |  |  |  | 20 |  |
| Dolomite clinker 1 mm or less |  |  |  |  |  |  |  |  | 10 |  |
| Slaked lime (% by weight of refractories) | (3) | (3) | (3) | (3) | (3) | (3) | (3) | (3) | (3) | (3) |
| Hexamethylene sodium phosphate (% by weight of refractories) | (4) | (4) | (4) | (4) | (4) | (4) | (4) | (4) | (4) | (4) |
| Tests |  |  |  |  |  |  |  |  |  |  |
| Slag erosion resistance (mm) | 4.7 | 4.6 | 4.6 | 4.7 | 4.9 | 5.3 | 4.5 | 4.9 | 6.2 | 11.2 |
| Slag penetration resistance (mm) | 4.2 | 7.6 | 7.1 | 11.1 | 3.8 | 4.0 | 13.2 | 5.2 | 6.1 | 3.9 |
| Spalling resistance | AA | AB | AB | BC | AA | AA | CC | BB | BB | AA |
| Slaking resistance Increase in weight (% by weight) | 1.5 | 10.1 | 7.5 | 11.6 | 1.3 | 2.8 | 13.3 | 8.2 | 22.4 | 1.4 |
| Actual machine test (number of cycles undergone) | 11 | 8 | 8 | 5 | 12 | 7 | 3 | 5 | 3 | 3 |

TABLE 4

Examples of monolithic refractories for pressurizing applications

|  | Present Invention | | | | | | Comparisons | | | | |
|---|---|---|---|---|---|---|---|---|---|---|---|
|  | 18 | 19 | 20 | 21 | 22 | 23 | 10 | 11 | 12 | 13 | 14 |
| Compositions (% by weight) |  |  |  |  |  |  |  |  |  |  |  |
| Magnesia clinker<1> 3-1 mm | 40 | 40 | 40 |  |  |  |  |  |  |  |  |
| Magnesia clinker<1> 1 mm or less | 20 | 20 | 20 |  |  |  |  |  |  |  |  |
| Magnesia clinker<1> 0.074 mm or less | 40 | 35 |  | 40 | 10 | 5 |  |  |  |  |  |
| Magnesia clinker<3> 3-1 mm |  |  |  |  | 40 | 40 | 40 |  |  | 40 |  |
| Magnesia clinker<3> 1 mm or less |  |  |  |  | 20 | 20 | 20 |  |  | 20 |  |
| Magnesia clinker<3> 0.074 mm or less |  |  |  |  | 30 | 35 | 40 |  |  | 30 | 20 |
| Sintered alumina 3-1 mm |  |  |  |  |  |  |  | 40 | 40 |  | 40 |
| Sintered alumina 1 mm or less |  |  |  |  |  |  |  | 20 | 20 |  | 20 |
| Sintered alumina 0.074 mm or less |  |  |  |  |  |  |  | 40 |  |  | 20 |
| Sintered spinel 3-1 mm |  |  |  | 40 |  |  |  |  |  |  |  |
| Sintered spinel 1 mm or less |  |  |  | 20 |  |  |  |  |  |  |  |
| Sintered spinel 0.074 mm or less |  |  | 40 |  |  |  |  |  | 40 |  |  |
| Zircon flour |  | 5 |  |  |  |  |  |  |  | 10 |  |
| Alumina cement (% by weight of refractories) | (20) | (20) | (20) | (20) | (20) | (20) | (20) | (20) | (20) | (20) | (20) |
| Polysodium acrylics (% by weight of refractories) | (0.1) | (0.1) | (0.1) | (0.1) | (0.1) | (0.1) | (0.1) | (0.1) | (0.1) | (0.1) | (0.1) |
| Tests |  |  |  |  |  |  |  |  |  |  |  |
| Slag erosion resistance (mm) | 5.8 | 6.1 | 8.2 | 7.7 | 5.7 | 5.9 | 6.0 | 14.8 | 13.2 | 6.3 | 11.1 |
| Slag penetration resistance (mm) | 4.7 | 4.4 | 3.9 | 4.2 | 5.8 | 9.2 | 11.4 | 6.8 | 4.0 | 6.1 | 4.2 |
| Spalling resistance | AA | AA | AA | AA | AB | BC | CC | BB | AA | BB | AA |
| Slaking resistance Increase in weight (% by weight) | 0.9 | 0.8 | 0.6 | 0.8 | 6.2 | 10.3 | 13.5 | 0.1 | 0.3 | 9.6 | 6.0 |
| Actual machine test (number of cycles undergone) | 23 | 25 | 20 | 22 | 18 | 12 | 10 | 7 | 9 | 12 | 13 |

The casting application type, especially when used for slag lines, was found to have superior structural spalling resistance because of its anti-slag penetration effect, and no trace of peeling was detected.

With the spray application type, peeling of the adhering surface was drastically reduced due to the anti-slag penetration effect.

Also, the pressurized application type did not exhibit cracking caused by thermal decomposition of magnesium hydroxide as was observed with conventional magnesia type pressurized application refractories.

Monolithic refractories for casting, spraying and pressurizing applications may be used with grain size compositions other than those indicated in the aforementioned examples, or may be used with sub-additives, binding agents or dispersing agents, and this invention is not necessarily limited to the proportional compositions as in the aforementioned examples.

What is claimed is:

1. Basic monolithic refractories consisting essentially of magnesia clinker with a chemical composition comprising, in oxide equivalence, 65%-96% by weight of MgO, 2.6%-20% by weight of $ZrO_2$, 1.3%-10% by weight of $SiO_2$, 2% or less by weight of CaO, 0.5% or less by weight of $Fe_2O_3$ and 1% or less by weight of $Al_2O_3$, and with a mineral composition containing periclase as the main component and cubic zirconia and forsterite as sub-components, and with apparent porosity of 7% or less and bulk density of 3.2 g/cm$^3$ or more.

2. Basic monolithic refractories consisting essentially of (1) magnesia clinker with a chemical composition comprising, in oxide equivalence, 65-96% by weight of MgO, 2.6-20% by weight of $ZrO_2$, 1.3-10% by weight of $SiO_2$, 2% or less by weight of CaO, 0.5% or less by weight of $Fe_2O_3$ and 1% or less by weight of $Al_2O_3$, and with a mineral composition containing periclase as the main component and cubic zirconia and forsterite as sub-components, and with apparent porosity of 7% or less and bulk density of 3.2 g/cm³ or more, and (2) at least one refractory material selected from the group consisting of calcined aluminous shale, calcined bauxite, sintered bauxite, sillimanite, synthetic mullite, fused alumina, sintered alumina, calcined alumina, sintered magnesia, electrofused magnesia, electrofused magnesia alumina spinel clinker, sintered magnesia alumina spinel clinker, zircon, zirconia and dolomite clinker.

* * * * *